US008670155B2

(12) United States Patent
Zeng et al.

(10) Patent No.: US 8,670,155 B2
(45) Date of Patent: Mar. 11, 2014

(54) CONVERSION OF K-ONLY DATA FROM A SOURCE TO A DESTINATION COLOR SPACE

(75) Inventors: Huanzhao Zeng, Vancouver, WA (US); Joseph W. Stellbrink, Corvallis, OR (US)

(73) Assignee: Hewlett-Packard Developmment Company, L.P., Houston, TX (US)

( * ) Notice: Subject to any disclaimer, the term of this patent is extended or adjusted under 35 U.S.C. 154(b) by 50 days.

(21) Appl. No.: 13/553,670

(22) Filed: Jul. 19, 2012

(65) Prior Publication Data
US 2014/0022570 A1 Jan. 23, 2014

(51) Int. Cl.
G06F 15/00 (2006.01)
H04N 1/60 (2006.01)
G06K 1/00 (2006.01)
H04N 1/40 (2006.01)

(52) U.S. Cl.
USPC ............................ 358/1.9; 358/3.23; 358/515

(58) Field of Classification Search
None
See application file for complete search history.

(56) References Cited

U.S. PATENT DOCUMENTS

| 7,046,393 | B2 | 5/2006 | Zeng | |
| 8,270,029 | B2 * | 9/2012 | Gil et al. | 358/1.9 |
| 2012/0087576 | A1 * | 4/2012 | Abe et al. | 382/162 |

OTHER PUBLICATIONS

Huanzhao Zeng, "A Fast linking approach for CMYK to CMYK conversion preserving black separation in ICC color management system", Proc. SPIE 5293, 262 (2003).
Huanzhao Zeng, "CMYK transformation with black preservation in color management system", Proc. SPIE 4663, 143 (2001).

* cited by examiner

*Primary Examiner* — Douglas Tran

(57) ABSTRACT

In an implementation, conversion of K-only data from a source CMYK color space to a destination CMYK color space is managed. The destination CMYK color space is transformed to a virtual RGB color space, in which a neutral axis of the virtual RGB color space is set to be mapped to destination K-only output colors in a color separation table for mapping of source K-only grays to destination K-only grays. The source CMYK color space is converted to a device independent color space and the conversion is adjusted such that the source K-only grays are forced to have the same chrominance as the neutral axis of the virtual RGB color space in the color separation table. The LUT is generated to include a K-only mapping by combining the virtual RGB color space with the adjusted conversion of the source K-only grays.

15 Claims, 6 Drawing Sheets

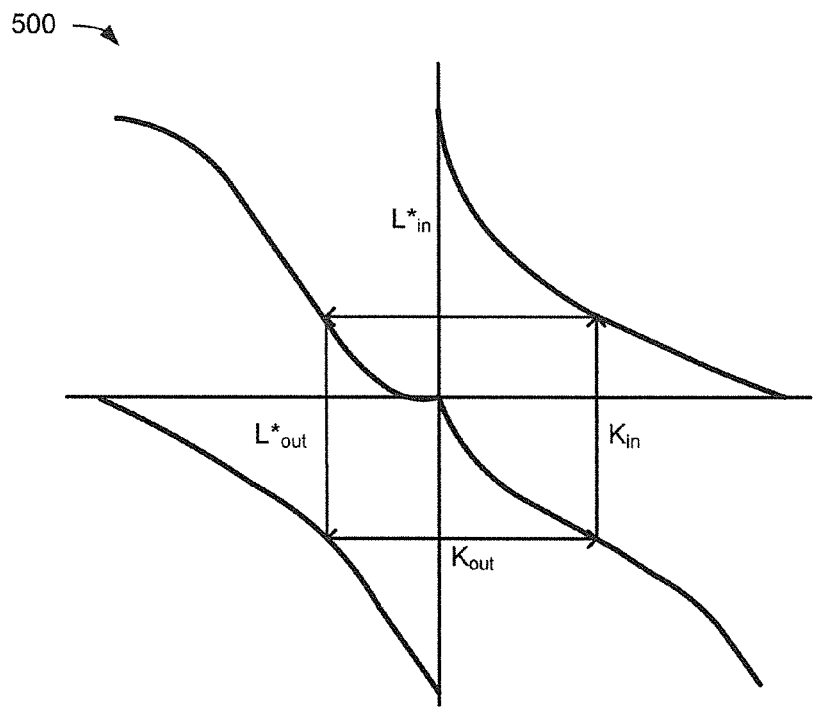
*FIG. 5A*
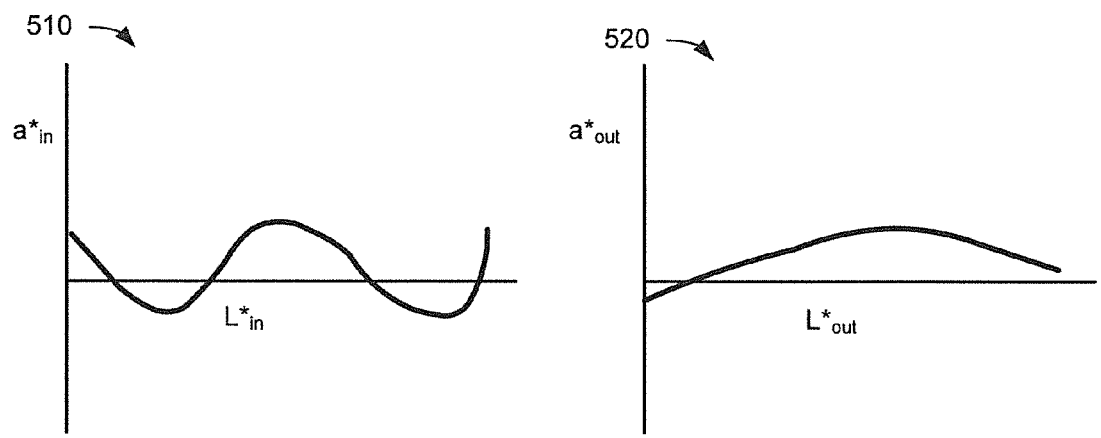
*FIG. 5B*   *FIG. 5C*

CONVERSION OF K-ONLY DATA FROM A SOURCE TO A DESTINATION COLOR SPACE

BACKGROUND

Printing devices for high volume production printing typically receive color data in printer CMYK color spaces. The printer CMYK color spaces are typically different from source CMYK color spaces. Without color characterization, the colors outputted by the printing devices are often inaccurate. One approach to correct these types of inaccuracies is to convert the source CMYK color space to a destination CMYK color space that is compatible with the printing device on which the data is to be outputted.

Various types of printing devices print K-only grayscale (also referred herein as K-only) content differently. In some applications, the K-only grayscale content is to be printed using only black ink, which guarantees neutral balance and substantially reduces printing costs. In printing black text and black line-art contents, using K-only printing may achieve higher print throughput and sharper edges. However, composite CMYK colors may be used to print the K-only grayscale content in relatively light (bright) color regions to improve smoothness of lighter tones. In standard ICC color management, input K-only grayscale content is converted to a profile connection space (PCS) and then to an output CMYK color space. As a result, under standard ICC color management techniques, K-only grayscale content is unable to be mapped to K-only output grayscales, which often results in higher printing costs and less robust neutral balance.

BRIEF DESCRIPTION OF DRAWINGS

Features of the present disclosure are illustrated by way of example and not limited in the following figure(s), in which like numerals indicate like elements, in which:

FIG. 5A depicts a tone mapping curve, according to an example of the present disclosure;

FIGS. 5B and 5C, respectively, depict plots of a* and L* according to examples of the present disclosure;

DETAILED DESCRIPTION

Figure 1:
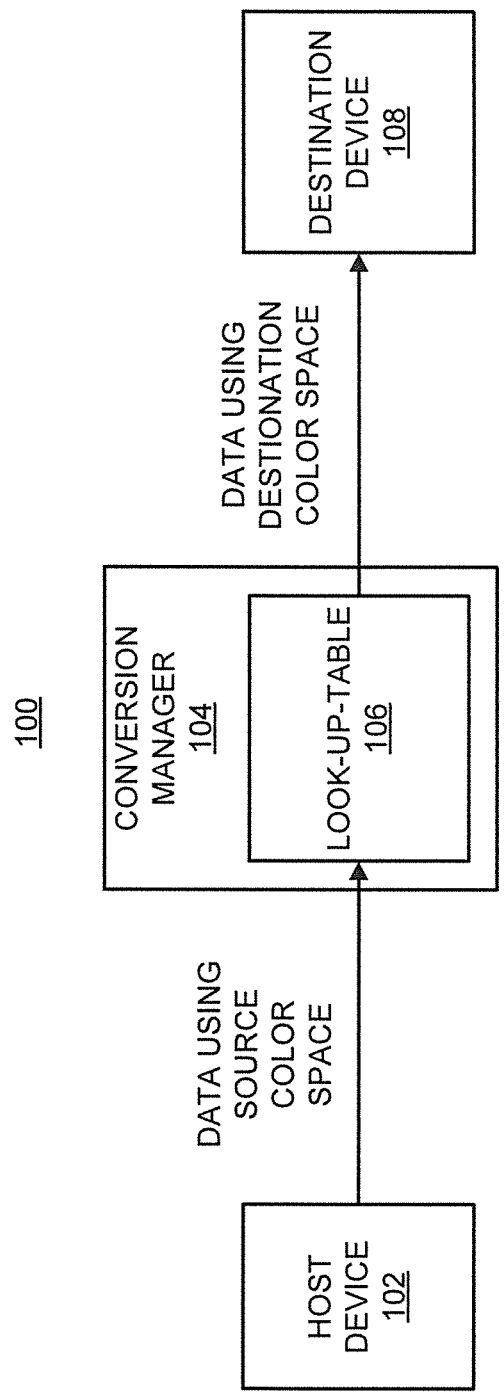
FIG. 1 illustrates a simplified block diagram of a color management system in which various aspects of the method and apparatus disclosed herein may be implemented, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

A printer's color gamut may be measured by generating print samples with varying amounts of cyan (C), magenta (M), yellow (Y), and black (K) inks and using a spectrophotometer to measure the amount of spectral light reflected from each sample. Since such measurements may be based on differing reference light values, standard methods for representing color information are commonly used, which are able to remove system and viewing-condition dependent variables and therefore be correlated to any given measurement system. Two such color coordinate systems are the CIE L*a*b* system and the CIE XYZ system, both of which are device independent color spaces. The entire color space for a printer may then be plotted by using the measured values in an interpolation process.

The source of printable data associated with a printer is typically referred to as a host, which may be a personal computer, laptop, PDA, digital camera or any data storage device designed to interface with the printer and pass data to it. The printable data exists in electronic format and may be created in various manners, including light capture from a digital camera or scanner, computer generation with imaging software, or computer capture from a graphics tablet. Depending on the method used to capture or create this digital imaging data, differing input color spaces may be used. For example, a digital camera may capture red (R), green (G), and blue (B) data. A graphic artist using a digital tablet might prefer to create documents in a CMYK color space. A person using digital imaging software could be working with black and white, grayscale, or even a custom color pallet. Like the output device color space, each of these input color spaces may also be converted into a device independent color space such as CIE L*a*b* or CIE XYZ.

Since printing gray and black using black ink or black toner consumes less amount of ink or toner than printing using CMYK inks and toners, it is cheaper to print gray and black using black ink or toner than using color inks or toners. Therefore, using K to replace CMY reduces printing costs. Second, in ink-based systems, there is a maximum amount of ink a given print media will absorb, so there is a practical limitation imposed on the amount of CMY ink which can be placed on a given location. Third, using K in place of CMY reduces the total ink coverage in inkjet systems allowing faster drying times. Fourth, using K in place of CMY reduces toner pile height in electrophotographic systems enabling more robust fusing.

Unfortunately, however, a conventional open-loop two-step conversion from an input CMYK color space to a device independent color space such as L*a*b* and then to an output CMYK color space results in loss of control over the K data. While an input set of CMYK values can result in only one set of L*a*b* values, converting from L*a*b* to an output set of CMYK values (provided the input K was not equal to zero) results in a theoretically infinite number of CMYK values which would perceptually have the same color, but which would have varying degrees of K, thereby removing the relationship between input K and output K and the control thereof.

For example, assume a color has been specified as K=0, C=30%, M=40%, and Y=80%. This color could be transformed to L*a*b*, adjusted to match the printer L*a*b*, and then converted to an output CMYK. The output CMYK, however, could be represented as [C,M,Y,K]=[0, 25, 45, 75] or [10, 15, 35, 65] or [4, 20, 40, 70], etc. As the K value is increased, the CMY values are decreased by a nearly correspondingly amount, each combination resulting in perceptually the same color. Given the indeterministic nature of this open-loop CMYK-to-L*a*b*-to-CMYK conversion, an empirical or predetermined look-up-table (LUT) or tables are typically developed, instead, to effect the conversion.

Disclosed herein is a method for managing conversion of K-only data from a source CMYK color space to a destination CMYK color space that preserves K-only grays. More particularly, the method disclosed herein enables generation of a LUT in which source or input K-only grays are mapped to destination or output K-only grays, which greatly improves the neutral balance in printing gray scales. In addition, for other colors that are not K-only, different parameters, such as GCR and UCR may be applied to optimize color separation. As further disclosed herein, a K-only mapping weight, which may be user defined, may be applied to control a weighting combination of using K-only mapping and using composite mapping to, for instance, substantially optimize the color mapping results for different media types. In this regard, the percentage of K-only mapping verses CMYK composite mapping may be adjusted during the color mapping process.

Also disclosed herein is an apparatus and a computer readable storage medium to implement the method. Through implementation of the method, apparatus, and instructions contained in the computer readable storage medium, a conversion of K-only data from a source CMYK color space to a destination CMYK color space is managed, in which, preservation of K-only grays is enabled for CMYK mapping, without requiring a special mapping for grays. In addition, the preservation of K-only grays is enabled on a local basis, which affords finer control over conversion of the K-only grays as compared with conventional conversion techniques.

With reference first to FIG. 1, there is shown a block diagram of a color management system 100 in which various aspects of the method and apparatus disclosed herein may be implemented, according to an example. It should be understood that the color management system 100 may include additional components and that some of the components described herein may be removed and/or modified without departing from a scope of the color management system 100.

As shown in FIG. 1, the color management system 100 includes a host device 102, a conversion manager 104 including look up table (LUT) 106, and a destination device 108. The host device 102 comprises, for instance, a computer system, a digital camera, a scanner, etc., and the destination device 108 comprises, for instance, a printer, a Web press, etc. The conversion manager 104 comprises an apparatus that is integrated and/or contained in one of the host device 102 and the destination device 108 or an apparatus that is separate from the host device 102 and the destination device 108. In a particular example, the conversion manager 104 comprises a machine readable instructions stored in the destination device 108 for converting data received from the host device 102 into a color space suitable for use by the destination device 108.

Particularly, as shown in FIG. 1, the host device 102 is to send color data using a source color space to be outputted by the destination device 108, which uses a destination color space to output the color data. In instances in which the destination device 108 prints only grayscale using only black ink, the destination device 108 may alternatively use a destination K-only color space. As generally occurs in color management systems, the source color space, which may comprise a source CMYK color space, is typically not the same as the destination color space. For instance, the source color space may comprise any of a specifications web offset publications (SWOP) color space, a Euro CMYK color space, a Japanese CMYK color space, a custom color space, etc., and the destination color space may be a device dependent color space, such as a specific CMYK ink space.

According to an example, the conversion manager 104 is to receive the color data sent by the host device 102 and to use a LUT 106 to convert the source color space data to the destination color space, to therefore make the color data be compatible with the destination device 108. As is described in greater detail in the present disclosure, the LUT 106 may be generated to provide a CMYK mapping method that maps source K-only grays to output colors that may be K-only grays or composite CMYK grays. In addition, a weighting factor, for instance, as defined by a user, may be applied to control the amount of K-only grays and composite CMYK grays that are to be applied in the output colors, as also discussed in detail herein.

Figure 2:
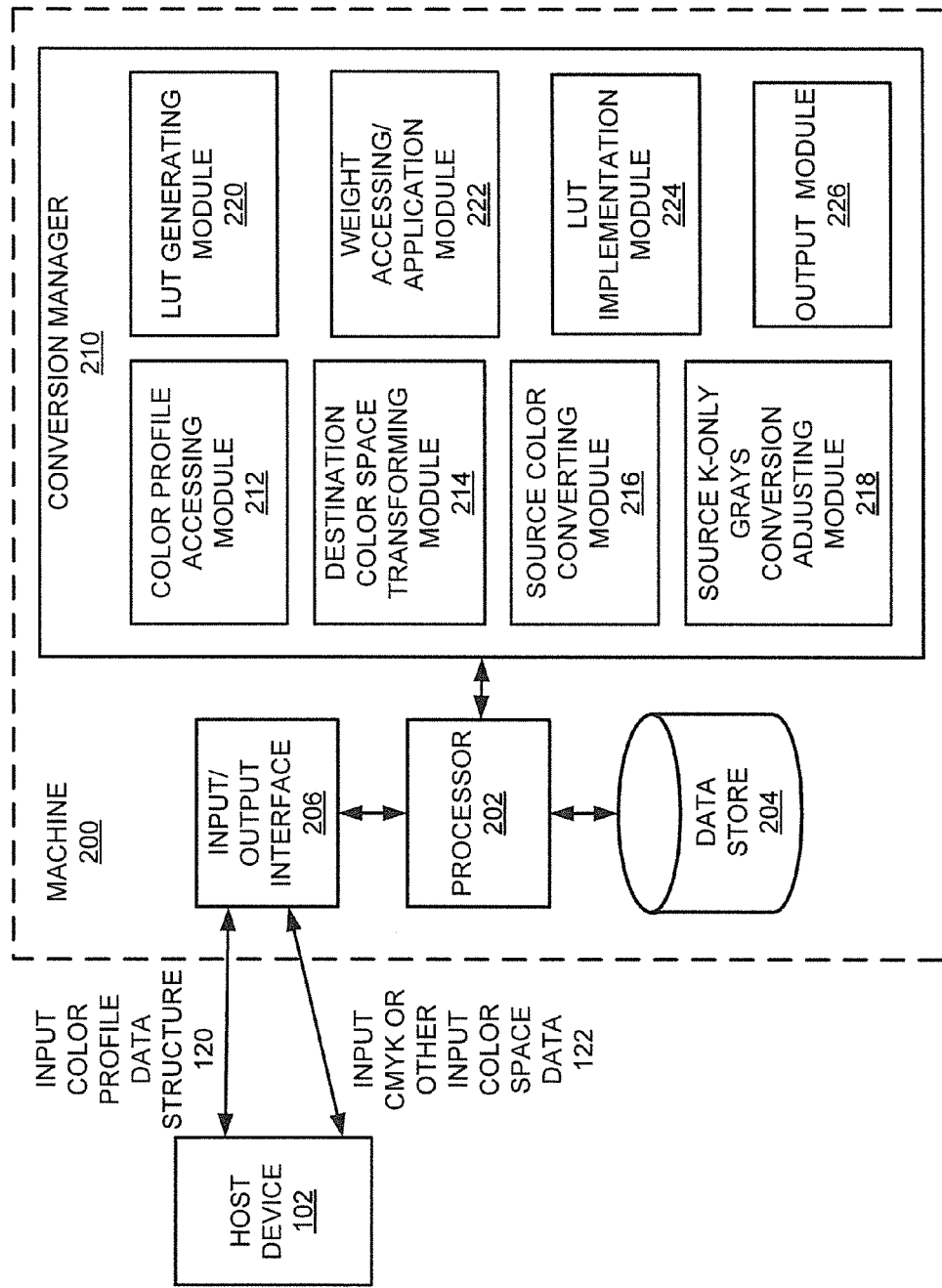
FIG. 2 shows a block diagram of a machine for managing color conversion, according to an example of the present disclosure.

Turning now to FIG. 2, there is shown a block diagram of a machine 200 for managing color conversion, according to an example. It should be understood that the machine 200 may include additional components and that some of the components described herein may be removed and/or modified without departing from the scope of the machine 200.

As shown, the machine 200 includes a processor 202, a data store 204, an input/output interface 206, and a conversion manager 210. Generally speaking, the machine 200 comprises a computer, personal digital assistant, server, printer, web press, etc., that is to convert source color space data received from a host device 102 to a destination color space data suitable for use in outputting the data by a destination device 108. In this regard, the machine 200 may comprise the destination device 108 or may comprise a separate device that is to convert the data to be suitable for use by the destination device 108.

The conversion manager 210, which may be equivalent to the conversion manager 104 depicted in FIG. 1, is depicted as including a color profile accessing module 212, a destination color space transforming module 214, a source color converting module 216, a source K-only grays conversion adjusting module 218, a LUT generating module 220, a weight accessing/application module 222, a LUT implementation module 224, and an output module 226. The processor 202, which may comprise a microprocessor, a micro-controller, an application specific integrated circuit (ASIC), or the like, is to perform various processing functions in the machine 200. One of the processing functions includes invoking or implementing the modules 212-226 contained in the conversion manager 210 as discussed in greater detail herein below.

According to an example, the conversion manager 210 comprises machine readable instructions stored, for instance, in a volatile or non-volatile memory, such as DRAM, EEPROM, MRAM, flash memory, floppy disk, a CD-ROM, a DVD-ROM, or other optical or magnetic media, and the like. In this example, the modules 212-226 comprise modules of machine readable instructions stored in the memory, which are executable by the processor 202. According to another example, the conversion manager 210 comprises a hardware device, such as a circuit or multiple circuits arranged on a board. In this example, the modules 212-226 comprise circuit components or individual circuits, which the processor 202 is to control or implement. According to a further example, the conversion manger 210 comprises a combination of modules with machine readable instructions and hardware modules.

The input/output interface 206 comprises a hardware and/or a software interface that may be connected to an internal bus and/or to a network, over which the host device 102, or other host devices, may communicate information to the machine 200. The connection between the host device 102 and the machine 200 may be a wired and/or wireless connection. In any regard, the processor 202 may receive the input color profile data structure 120 and the input CMYK or other input color space data 122 from the host device 102. The processor 202 may store the received data 120, 122 in the data store 204, which comprises volatile and/or non-volatile memory, such as DRAM, EEPROM, MRAM, phase change RAM (PCRAM), Memristor, flash memory, and the like.

According to an example in which the machine 200 comprises a separate apparatus from the destination device 108, the output module 226 outputs converted color data to be implemented by the destination device 108 through the input/output interface 206. In another example in which the machine 200 comprises the destination device 108, the machine 200 may include a outputting mechanism, such as a printing mechanism, that is to implement the converted color data in printing the color data received from the host device 102.

Figure 3:
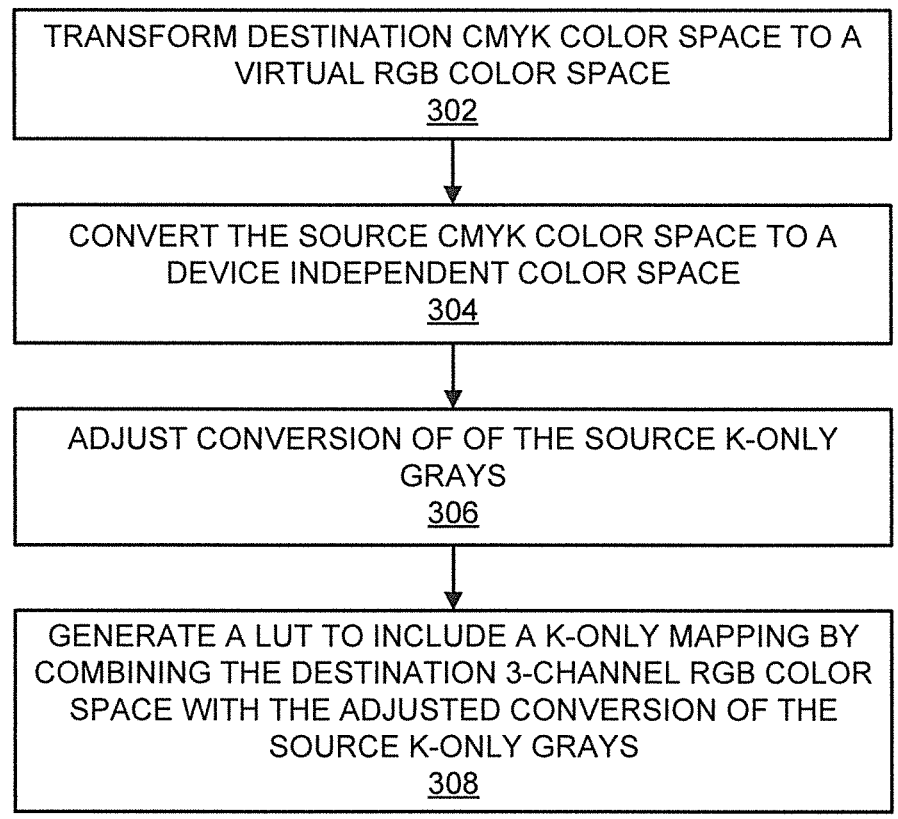
FIG. 3 illustrates a flow diagram of a method for managing conversion of K-only data from a source CMYK color space to a destination CMYK color space, according to an example of the present disclosure.
Figure 4:
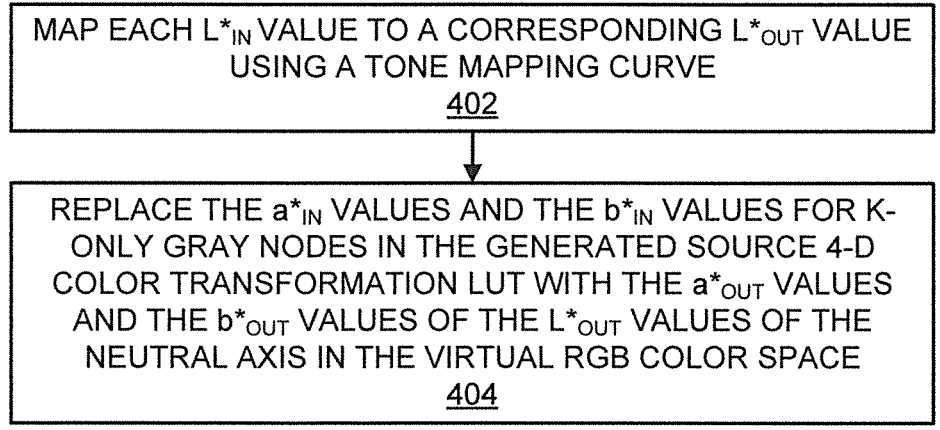
FIG. 4 illustrates a flow diagram of a method for adjusting the conversion of the source K-only grays in FIG. 3, according to an example of the present disclosure.
Figure 6:
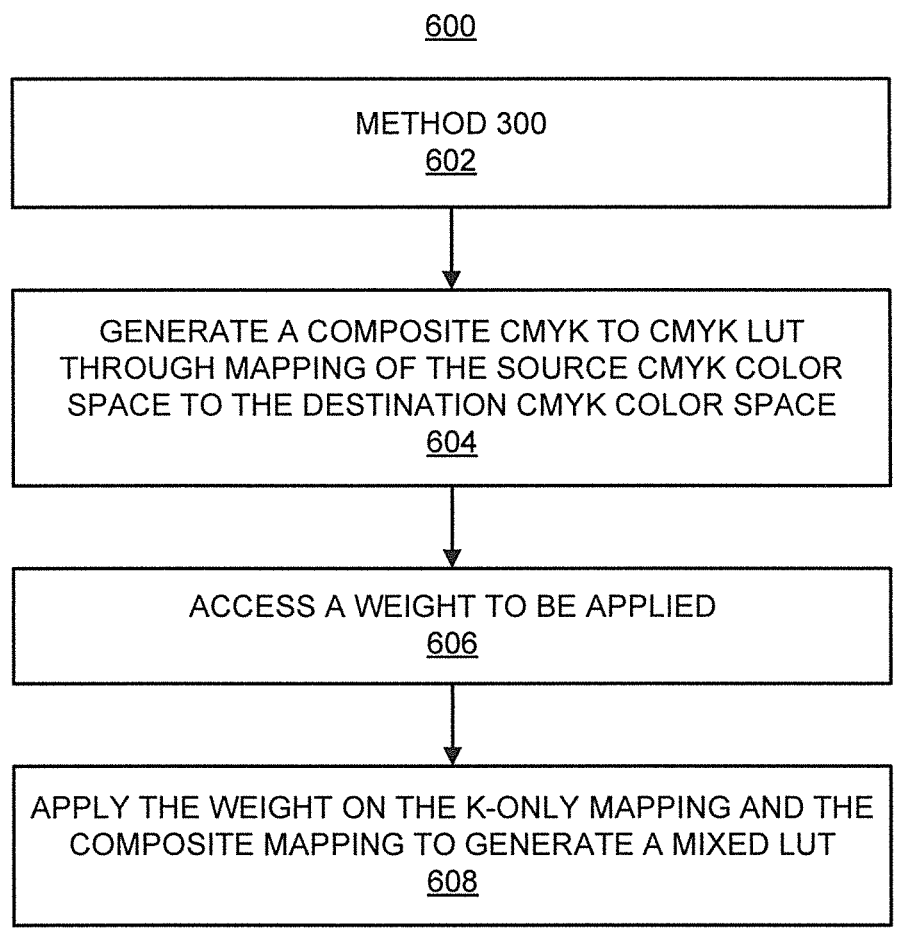
FIG. 6 depicts a flow diagram of a method of for managing conversion of K-only data from a source CMYK color space to a destination CMYK color space, according to an example of the present disclosure.

Various manners in which the modules 212-226 of the conversion manager 210 may operate are discussed with respect to the methods 300, 400, and 600 respectively depicted in FIGS. 3, 4, and 6. It should be readily apparent that the methods 300, 400, and 600 represent generalized illustrations and that other elements may be added or existing elements may be removed, modified or rearranged without departing from the scopes of the methods 300, 400, and 600.

With reference first to FIG. 3, there is shown a flow diagram of a method 300 for managing conversion of K-only data from a source CMYK color space to a destination CMYK color space, according to an example. The source CMYK color space comprises the color space of the host device 102 and the destination CMYK color space comprises the color space of the destination device 108. In addition, the method 300 pertains to generating a LUT in which source K-only grays are mapped to destination K-only grays, which greatly improves the neutral balance in printing gray scales over conventional printing techniques.

At block 302, the destination CMYK color space is transformed to a virtual RGB color space (also named as printer RGB color space or printer CMY color space), for instance, by the destination color space transforming module 214. More particularly, a 4-dimensional CMYK color space is reduced to a 3-dimensional color space, which greatly reduces the complexity of the color processing. The black usage is determined in this transformation. In addition, the "virtual" is to note that the RGB color space is not a physical color space. The virtual RGB color space is defined such that a neutral axis (R=G=B) of the virtual RGB color space is set to be mapped to destination K-only output colors in a color separation table for mapping of source K-only grays to destination K-only grays. In other words, at block 302, the neutral axis (R=G=B) is mapped to CMYK values of $(0,0,0,K_{out})$ or the K-only color space.

According to an example, the transformation at block 302 may be performed through use of a table for CMYK color space to the device independent color space contained in a destination color profile. The destination color profile, which may comprise the International Color Consortium (ICC) color profile of the destination device 108 may be accessed by the color profile accessing module 212. As a result, the transformation at block 302 includes conversions from the virtual RGB color space to the device independent color space. In addition, for the K-only mapping, which occurs when the source data has K-only data, i.e., instances in which K-only is to be printed, conversion from the source K-only to the device independent color will be generated. In these instances, the values of R, G, and B for the destination device 108 are equal to each other, i.e., R=G=B., which is converted to the device independent color space.

At block 304, the source CMYK color space is converted to a device independent color space, in which the source CMYK color space includes source K-only grays, for instance, by the source color converting module 216. According to an example, the conversion is performed through use of a source color profile, which may be accessed by the color profile accessing module 212. The source color profile, which may comprise the ICC color profile of the host device 102, may have been received from the host device 102 as the input color profile data structure 120 in FIG. 2. In any regard, the source color profile contains a table to convert the source CMYK color space of the host device 102 to a device independent color space, such as CIELAB, CIE XYZ, CIE CAM97s, CIECAM02 JAB, etc. By way of example, the source CMYK color space is converted to the CIELAB color space.

At block 306, conversion of the source K-only grays is adjusted such that the source K-only grays are forced to have the same chrominance as the neutral axis of the virtual RGB color space, for instance, by the source K-only grays conversion adjusting module 218. According to an example, the conversion of the source K-only grays is adjusted by forcing the source K-only colors to be mapped to the destination K-only colors using a black tone mapping curve. The black tone mapping curve defines the mapping from the source K to the destination K. The black tone mapping curve is determined by the transformation curve of the source K, the color rendering, and the transformation curve of the destination K. A manner in which the source K-only color is forced to be mapped to the destination K-only mapping is described in greater detail in the method 400 depicted in FIG. 4.

At block 308, a LUT is generated to include a K-only mapping by combining the destination 3-channel RGB color space with the adjusted conversion of the source K-only grays, for instance, by the LUT generating module 220. The LUT generated through implementation of the method 300 enables mapping of source K-only grays to destination K-only grays.

Tuning now to FIG. 4, there is shown a flow diagram of a method 400 for adjusting the conversion of the source K-only grays at block 306, according to an example. Particularly, the method 400 includes operations for forcing the source K-only color space to be mapped to the destination K-only color space. For instance, the method 400 includes operations for forcing the source device independent color space, e.g., $Lab_{in}$, to be mapped to the destination device independent color space, e.g., $Lab_{out}$.

The method 400 is described with respect to the black tone mapping curve 500 depicted in FIG. 5A and the plots 510 and 520 respective depicted in FIGS. 5B and 5C. The black tone mapping curve 500 illustrates the mapping from $K_{in}$ to $L^*_{in}$ to $L^*_{out}$ and to $K_{out}$. In addition, the plots 510 and 520 illustrate that the $a^*_{in}$ and $a^*_{out}$ values are mostly not zero for K-only colors because both black inks are not perfect neutral. Plots for $b^*_{in}$, $b^*_{out}$ values may similarly be generated.

At block 402, each $L^*_{in}$ is mapped to a corresponding $L^*_{out}$ value using the black tone mapping curve 500, wherein each input gray value for each $L^*_{in}$ has an $a^*_{in}$ value and a $b^*_{in}$ and each corresponding $L^*_{out}$ value has an $a^*_{out}$ value and a $b^*_{out}$ value.

At block 404, the $a^*_{in}$ and the $b^*_{in}$ values for K-only input gray nodes in the generated 3-D color transformation LUT are replaced with the $a^*_{out}$ values and the $b^*_{out}$ values of the corresponding $L^*_{out}$ values of the neutral axis in the virtual RGB color space. This replacement generally forces the source CMYK values (0, 0, 0, $K_{in}$) to be mapped to the destination CMYK values (0, 0, 0, $K_{out}$) even if colors of the two blacks are different from each other.

Turning now to FIG. 6, there is shown a flow diagram of a method 600 for managing conversion of K-only data from a source CMYK color space to a destination CMYK color space, according to another example. The method 600 may be implemented following and/or during implementation of the operations discussed above with respect to the method 300. In this regard, block 602 may include implementation of the method 300. It should, however, be understood that various operations discussed with respect to the method 600 may be implemented concurrently with or between various operations in the method 300.

At block 604, a composite CMYK to CMYK LUT is generated through mapping of the source CMYK color space to the destination CMYK color space, for instance, by the LUT generating module 220. The composite mapping may be created through application of any of a variety of different approaches, for instance, through application of the under color removal (UCR) approach, the Grey Component Replacement (GCR) approach, etc. In this process, the source CMYK color space may be converted to a device-independent color space using the source ICC profile, and then to the destination CMYK color space using the destination ICC profile. Therefore, there is no special K to K mapping with the CMYK LUT generated at block 604. Thus, a K-only source color may be mapped to a composite CMYK color. In one regard, the CMYK LUT is also construed as a "composite" LUT.

At block 606, a weight to be applied for a combination of the K-only mapping and the composite mapping is accessed, for instance, by the weight accessing/application module 222. Generally speaking, the weight comprises a value of a weighting that is to be applied in the use of the K-only mapping, which may be user-defined. In this regard, if a weight (w) is applied to the K-only mapping, then a weight of (1-w) is applied to the composite mapping. By way of example, the weight may be assigned such that K-only mapping is desired over the composite mapping to increase use of black ink. Alternatively, the weight may be assigned such that composite mapping is desired for higher photo printing quality.

At block 608, the accessed weight is applied on the combination of the K-only mapping and the composite mapping to generate a mixed LUT, for instance, by the weight accessing/application module 222. The mixed LUT is generated with the K-only mapping and the composite mapping weighted according to the applied weight, for instance, by the LUT generating module 220. In this regard, the method 600 enables a hybrid mapping process that mixes the K-only mapping method 300 of FIG. 3 and a composite mapping method with a weighted combination of the two processes.

Although not shown in the methods 300 and 600, the generated LUT may be implemented to convert source CMYK color space data to destination CMYK color space data, for instance, by the LUT implementation module 224. In addition, the converted data may be outputted by the output module 226 either to the destination device 108 or to a printing apparatus within the machine 200 in instances in which the machine 200 comprises the destination device 108.

Some or all of the operations set forth in the methods 300, 400, and 600 may be contained as utilities, programs, or subprograms, in any desired computer accessible medium. In addition, the methods 300, 400, and 600 may be embodied by computer programs, which can exist in a variety of forms both active and inactive. For example, they may exist as software program(s) comprised of program instructions in source code, object code, executable code or other formats. Any of the above may be embodied on a computer readable storage medium.

Example computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 7:
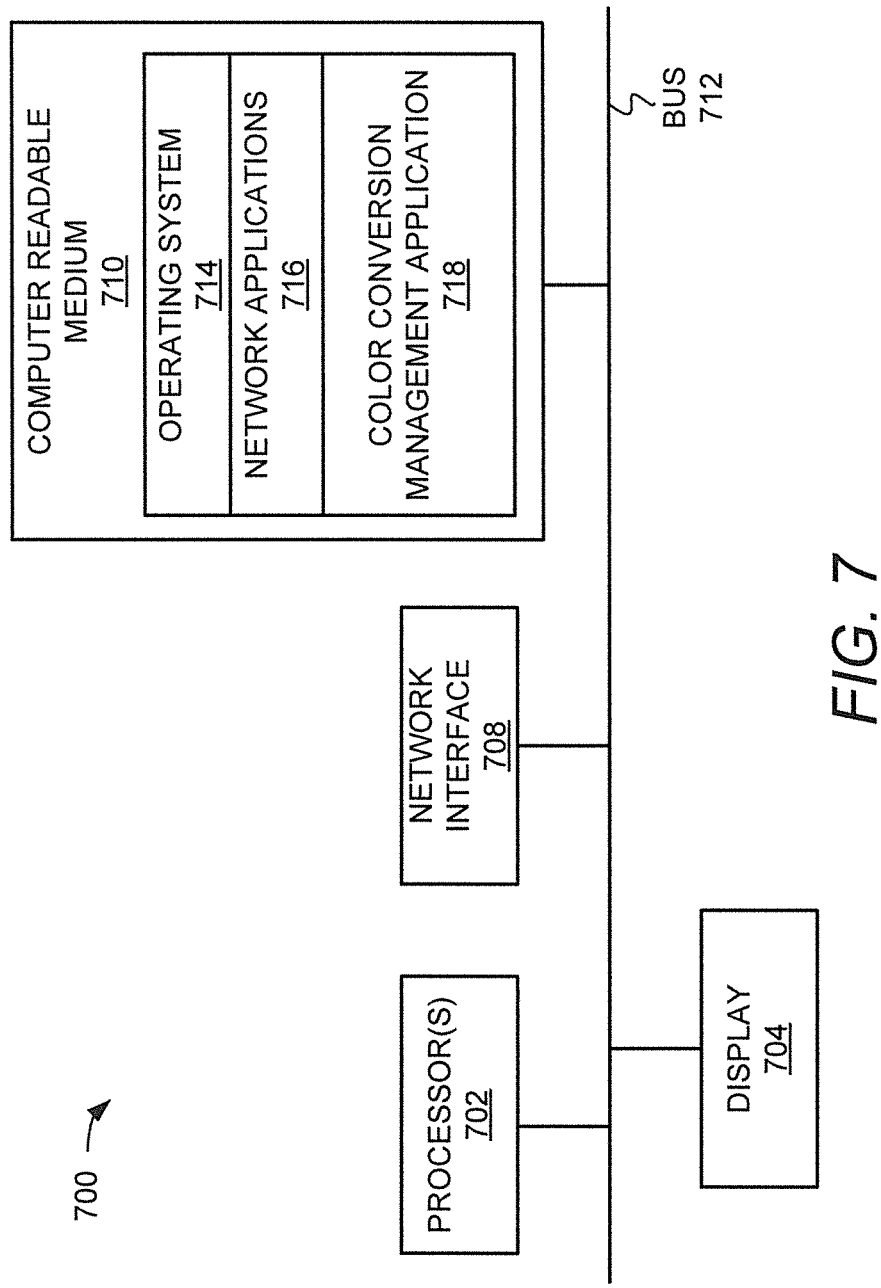
FIG. 7 illustrates a block diagram of a computing device to implement the methods depicted in FIGS. 3, 4, and 6, according to example of the present disclosure.

Turning now to FIG. 7, there is shown a block diagram of a computing device 700 to implement the methods depicted in FIGS. 3, 4, and 6, in accordance with examples of the present disclosure. The device 700 includes a processor 702, such as a central processing unit; a display device 704, such as a monitor; a network interface 708, such as a Local Area Network LAN, a wireless 802.11x LAN, a 3G mobile WAN or a WiMax WAN; and a computer-readable medium 710. Each of these components is operatively coupled to a bus 712. For example, the bus 712 may be an EISA, a PCI, a USB, a FireWire, a NuBus, or a PDS.

The computer readable medium 710 may be any suitable non-transitory medium that participates in providing instructions to the processor 702 for execution. For example, the computer readable medium 710 may be non-volatile media, such as an optical or a magnetic disk; volatile media, such as memory; and transmission media, such as coaxial cables, copper wire, and fiber optics.

The computer-readable medium 710 may also store an operating system 714, such as Mac OS, MS Windows, Unix, or Linux; network applications 716; and a color conversion management application 718. The network applications 716 include various components for establishing and maintaining network connections, such as machine readable instructions for implementing communication protocols including TCP/IP, HTTP, Ethernet, USB, and FireWire.

The color conversion management application 718 provides various components for managing color conversion in a machine 200, as described above. The management application 718 may thus comprise the conversion manager 210 discussed above. In this regard, the management application 718 may include the modules 212-226, which are also discussed above. In certain examples, some or all of the processes performed by the application 718 may be integrated into the operating system 714. In certain examples, the processes may be at least partially implemented in digital electronic circuitry, or in computer hardware, machine readable instructions (including firmware and/or software), or in any combination thereof.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations.

The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for managing conversion of K-only data from a source CMYK color space to a destination CMYK color space, the method comprising:
    transforming the destination CMYK color space to a virtual RGB color space, wherein a neutral axis of the virtual RGB color space is set to be mapped to destination K-only output colors in a color separation table for mapping of source K-only grays to destination K-only grays;
    converting the source CMYK color space to a device independent color space, wherein the source CMYK color space includes source K-only grays;
    adjusting conversion of the source K-only grays such that the source K-only grays are forced to have the same chrominance as the neutral axis of the virtual RGB color space in the color separation table; and
    generating a look-up-table (LUT) to include a K-only mapping by combining the virtual RGB color space with the adjusted conversion of the source K-only grays.

2. The method according to claim 1, wherein adjusting the conversion of the source K-only grays further comprises forcing the source K-only color space to be mapped to the destination K-only color space using a black tone mapping curve.

3. The method according to claim 2, wherein forcing the source K-only color space to be mapped to the destination K-only color space further comprises:
    mapping each $L^*_{in}$ value to a corresponding $L^*_{out}$ value using the black tone mapping curve, wherein each input gray value for each $L^*_{in}$ has an $a^*_{in}$ value and a $b^*_{in}$ value and each corresponding $L^*_{out}$ value has an $a^*_{out}$ value and a $b^*_{out}$ value; and
    replacing the $a^*_{in}$ values and the $b^*_{in}$ values for K-only input gray nodes in the generated 3-D color transformation LUT with the $a^*_{out}$ values and the $b^*_{out}$ values of the $L^*_{out}$ values of the neutral axis in the virtual RGB color space.

4. The method according to claim 1, further comprising:
    generating a composite mapping through mapping of the source CMYK color space to the destination CMYK color space.

5. The method according to claim 4, wherein generating the LUT further comprises generating a mixed LUT comprising a combination of the K-only mapping and the composite mapping.

6. The method according to claim 5, further comprising:
    accessing a weight for the combination of the K-only mapping and the composite mapping;
    applying the weight on the combination of the K-only mapping and the composite mapping; and
    wherein generating the mixed LUT further comprises generating the mixed LUT with the K-only mapping and the composite mapping weighted according to the applied weight.

7. The method according to claim 1, further comprising:
    accessing a source color profile that contains a table to convert the source CMYK color space to a device independent color space, and wherein converting the source CMYK color space further comprises converting the source CMYK color space through use of the table contained in the source color profile.

8. The method according to claim 1, further comprising:
    accessing a destination color profile that contains a table to convert the destination CMYK color space to a device independent color space, and wherein transforming the destination CMYK color space to the virtual RGB color space comprises using the table contained in the destination color profile to transform the destination CMYK color space to the virtual RGB color space.

9. An apparatus for managing conversion of K-only data from a source CMYK color space to a destination CMYK color space, the apparatus comprising:
    a memory storing at least one module comprising machine readable instructions to:
        transform the destination CMYK color space to a virtual RGB color space, wherein a neutral axis of the virtual RGB color space is set to be mapped to destination K-only output colors in a color separation table for mapping of source K-only grays to destination K-only grays;
        convert the source CMYK color space to a device independent color space, wherein the source CMYK color space includes source K-only grays;
        adjust conversion of the source K-only grays such that the source K-only grays are forced to have the same chrominance as the neutral axis of the virtual RGB color space in the color separation table; and
        generate a lookup table (LUT) to include a K-only mapping by combining the virtual RGB color space with the adjusted conversion of the source K-only grays; and
    a processor to implement the at least one module.

10. The apparatus according to claim 9, wherein the at least one module further comprises machine readable instructions to:
    force the source K-only color space to be mapped to the destination K-only color space using a black tone mapping curve to adjust the conversion of the source K-only grays.

11. The apparatus according to claim 10, wherein the at least one module further comprises machine readable instructions to:
    map each $L^*_{in}$ value to a corresponding $L^*_{out}$ value using the black tone mapping curve, wherein each input gray value for each $L^*_{in}$ has an $a^*_{in}$ value and a $b^*_{in}$ value and each corresponding $L^*_{out}$ value has an $a^*_{out}$ value and a $b^*_{out}$ value; and
    replace the $a^*_{in}$ values and the $b^*_{in}$ values for K-only input gray nodes in the generated 3-D color transformation LUT with the $a^*_{out}$ values and the $b^*_{out}$ values of the $L^*_{out}$ values of the neutral axis in the virtual RGB color space.

12. The apparatus according to claim 9, wherein the at least one module further comprises machine readable instructions to:
    generate a composite mapping through mapping of the source CMYK color space to the destination CMYK color space; and
    generate the LUT to include a mixed LUT comprising a combination of the K-only mapping and the composite mapping.

13. The apparatus according to claim 12, wherein the at least one module further comprises machine readable instructions to:
    access a weight for the combination of the K-only mapping and the composite mapping;
    apply the weight on the combination of the K-only mapping and the composite mapping; and generate the mixed LUT with the K-only mapping and the composite mapping weighted according to the applied weight.

14. A non-transitory computer readable storage medium on which is embedded at least one computer program that when executed by a processor, implements a method for managing conversion of K-only data from a source CMYK color space to a destination CMYK color space, said at least one computer program comprising computer readable code to:

transform the destination CMYK color space to a virtual RGB color space, wherein a neutral axis of the virtual RGB color space is set to be mapped to destination K-only output colors in a color separation table for mapping of source K-only grays to destination K-only grays;

convert the source CMYK color space to a device independent color space, wherein the source CMYK color space includes source K-only grays;

adjust conversion of the source K-only grays such that the source K-only grays are forced to have the same chrominance as the neutral axis of the virtual RGB color space in the color separation table using a black tone mapping curve; and generate a lookup table (LUT) to include a K-only mapping by combining the virtual RGB color space with the adjusted conversion of the source K-only grays.

15. The non-transitory computer readable storage medium according to claim 14, said at least one computer program further comprising computer readable code to:

map each $L^*_{in}$ value to a corresponding $L^*_{out}$ value using the black tone mapping curve, wherein each input gray value for each $L^*_{in}$ has an $a^*_{in}$ value and a $b^*_{in}$ value and each corresponding $L^*_{out}$ value has an $a^*_{out}$ value and a $b^*_{out}$ value; and replace the $a^*_{in}$ values and the $b^*_{in}$ values for K-only input gray nodes in the generated 3-D color transformation LUT with the $a^*_{out}$ values and the $b^*_{out}$ values of the $L^*_{out}$ values of the neutral axis in the virtual RGB color space to force the source K-only color space to be mapped to the destination K-only color space.

\* \* \* \* \*

UNITED STATES PATENT AND TRADEMARK OFFICE
CERTIFICATE OF CORRECTION

| | | |
|---|---|---|
| PATENT NO. | : 8,670,155 B2 | Page 1 of 1 |
| APPLICATION NO. | : 13/553670 | |
| DATED | : March 11, 2014 | |
| INVENTOR(S) | : Huanzhao Zeng et al. | |

It is certified that error appears in the above-identified patent and that said Letters Patent is hereby corrected as shown below:

On the title page item (73), Assignee, in column 1, line 1, delete "Developmment" and insert -- Development --, therefor.

Signed and Sealed this
Second Day of June, 2015

Michelle K. Lee
*Director of the United States Patent and Trademark Office*